United States Patent [19]

Schelhorn et al.

[11] Patent Number: 5,277,955
[45] Date of Patent: Jan. 11, 1994

[54] INSULATION ASSEMBLY

[75] Inventors: Jean E. Schelhorn, Granville; John L. Olinger, Newark; Clarke Berdan, II, Granville, all of Ohio

[73] Assignee: Owens-Corning Fiberglas Technology Inc., Summit, Ill.

[21] Appl. No.: 447,763

[22] Filed: Dec. 8, 1989

[51] Int. Cl.$^5$ .............................................. B32B 1/06
[52] U.S. Cl. ........................................ 428/74; 428/76; 428/219; 428/220
[58] Field of Search ................... 428/74, 76, 219, 220; 156/71

[56] References Cited

U.S. PATENT DOCUMENTS

| | | | |
|---|---|---|---|
| 2,028,253 | 1/1936 | Spafford | 154/44 |
| 2,045,733 | 6/1936 | Spafford | 154/45 |
| 2,113,068 | 4/1938 | McLaughlin, Jr. | 154/44 |
| 2,159,053 | 5/1939 | Saborsky | 20/4 |
| 2,160,001 | 5/1939 | Saborsky | 20/4 |
| 2,330,941 | 10/1943 | Acuff, Jr. et al. | 20/4 |
| 2,335,220 | 11/1943 | Edwards | 154/44 |
| 2,373,500 | 4/1945 | Pearce | 154/27 |
| 2,495,636 | 1/1950 | Hoeltzel et al. | 428/76 |
| 2,500,690 | 3/1950 | Lannan | 154/1 |
| 2,579,036 | 12/1951 | Edelman | 154/44 |
| 2,610,337 | 9/1952 | McMillin et al. | 5/361 |
| 2,742,385 | 4/1956 | Bovenkerk | 428/74 |
| 3,039,981 | 6/1962 | Shannon et al. | 260/29.3 |
| 3,264,165 | 8/1966 | Stickel | 428/74 |
| 3,347,648 | 10/1967 | Krakauer et al. | 65/3 |
| 3,493,452 | 2/1970 | Cole | 156/254 |
| 3,513,628 | 5/1970 | Lee et al. | 53/124 |
| 3,729,879 | 5/1973 | Franklin | 52/173 |
| 3,819,468 | 6/1974 | Sauder et al. | 52/270 |
| 3,832,815 | 9/1974 | Balaz et al. | 52/227 |
| 3,877,911 | 4/1975 | Borst | 65/3 |
| 4,128,678 | 12/1978 | Metcalfe et al. | 428/119 |
| 4,172,345 | 10/1979 | Alderman | 52/406 |
| 4,238,257 | 12/1980 | Remi et al. | 156/71 |
| 4,399,175 | 8/1983 | Kummermehr et al. | 428/76 |
| 4,556,593 | 12/1985 | Hughes | 428/72 |
| 4,569,174 | 2/1986 | Bossany | 52/406 |
| 4,590,714 | 5/1986 | Walker | 52/3 |
| 4,696,138 | 9/1987 | Bullock | 52/407 |
| 4,707,960 | 11/1987 | Bullock | 52/404 |

FOREIGN PATENT DOCUMENTS

| | | |
|---|---|---|
| 587691 | 11/1933 | Fed. Rep. of Germany ........ 428/74 |
| 5508 | 12/1972 | Japan . |
| 21515 | 12/1974 | Japan . |
| 14979 | 12/1976 | Japan . |
| 73708 | 12/1978 | Japan . |
| 143156 | 12/1978 | Japan . |
| 42730 | 12/1979 | Japan . |
| 84657 | 12/1979 | Japan . |
| 51382 | 12/1980 | Japan . |
| 23583 | 5/1982 | Japan . |

OTHER PUBLICATIONS

"Membranes Improve Insulation Efficiency", by Christopher A. Bullock, Third Annual Symposium on Improving Building Energy Efficiency In Hot And Humid Climates, Nov. 18-19, 1986, Arlington, Tex.
"Attic Seal—'Convection Barrier' for Attic Insulation", Energy Design Update, Jun. 1988, pp. 10-13.
"Fiberglas Building Insulation In Residential Construction", Owens-Corning Fiberglas Corp. brochure, Fiberglas Standards A8.2.1, Oct. 1946.
"Criterion for the appearance of natural convection in an Anisotropic porous layer" by J. F. Epherre, International Chemical Engineering (vol. 17, No. 4) Oct. 1977, pp. 615-616.

(List continued on next page.)

Primary Examiner—Alexander S. Thomas
Attorney, Agent, or Firm—Ted C. Gillespie

[57] ABSTRACT

An insulation assembly for insulating buildings is disclosed. The insulation assembly includes a low density, binderless, mineral fiber mat, such as a binderless fibrous glass batt which is covered by a layer to form a package. The batt is joined to the package by an adhesive and air passageway is defined by the package for directing atmospheric air to the batt. The insulation assembly is lightweight and has a compression ratio in excess of 6:1.

15 Claims, 2 Drawing Sheets

OTHER PUBLICATIONS

"Natural Convection in Enclosed Porous Media With Rectangular Boundaries" by B. K. C. Chan et al., Journal of Heat Transfer, Feb. 1970 pp. 21-27.

"Thermal Performance of the Exterior Envelopes of Buildings II", Proceedings of the ASHRAE/DOE Conference, Dec. 6-9, 1982.

"Thermal Performance of Residential Attic Insulation", by Kenneth E. Wilkes et al., Energy and Buildings, May 1983, pp. 263-277.

"Thermo-Brite ® Radiant Barrier", PARSEC Product Bulletin 200-1, Jun. 1984, PARSEC, Inc.

"Natural Convection in Vertical Permeable Space", by Claes G. Bankvall, Warme- und Stoffubertragung, Jul. 1974, No. 1.

"Lessons From A Mock Attic" by Nancy Armistead, Popular Science, Dec. 1992.

"Evaluation of Attic Seal Products Applied To Loose-Fill Fiberglass Insulation In A Simulated Residential Attic—Phases I and II", by K. E. Wilkes et al., Oak Ridge National Laboratory, Letter Report ORNL-/M-1644, Aug. 1991.

"R-19 Insulation Only", picture of product cover, Nov. 18, 1982, Owens-Corning Fiberglas Corp.

INSULATION ASSEMBLY

BACKGROUND OF THE INVENTION

The invention relates to an insulation assembly which is used to insulate buildings and, for examples, to insulate floors, ceilings and the like of such buildings.

It is well known in the art to insulate buildings using various types of insulating materials including mineral fibers such as fibrous glass wool.

Prior art fibrous glass wool insulation often included combining a binder, such as a phenolic resin with glass wool subsequent to the fiberizing process. The resultant insulating material assembly had sufficient strength to support itself in long strips so that it could be, for example, placed between adjacent wall studs or ceiling trusses in a commercial or residential building.

Glass fiber insulation is generally made by laying down a blanket of multiple horizontal layers of glass fibers onto a moving belt. Very early on, in the industry, no binder was used. However, by the late 1930's and early 1940's the industry began to use an organic binder, such as the above-mentioned phenolic resin, which was thought to be necessary to give the insulation material structural integrity for handling, and to enable the blanket to recover its thickness and insulating value after being compressed during packaging and transportion. Thus, it is the current practice in the prior art to apply such binder materials to the fibers as the insulation blanket is being formed, and to partially compress and heat the resulting blanket to cure the binder and set the loft. The blanket is thereafter cut into batts or rolls and tightly compressed for packaging and transport.

Numerous types of binder compositions have been developed over the years as necessary components in prior art insulation assemblies.

The prior art teaches that a high recovery ratio in a fibrous glass batt having a low density is unexpected and not inherently found in binderless products of the past. McMillin and Sakarash U.S. Pat. No. 2,610,337 teaches the use of ultra-fine glass fibers to form soft, resilient mats for use as filling in cushions and the like. This prior art patent indicates that with such ultra-fine glass fibers, as much as 25 to 30% bonding agent may be used without causing undue stiffness. The patent states "although the bat becomes less resilient with decreased amounts of binder, as little as 5% by weight of the binder, when calculated on the weight of the finished product, has been successfully employed."

SUMMARY OF THE INVENTION

The present invention relates to an insulation assembly which provides an improved unitary building insulation assembly which can be rapidly and effectively installed between, for examples, wall studs or ceiling trusses of a building.

The focal point of the present invention is an insulation assembly in which all binder or essentially all of the binder is eliminated. It has been found that despite teachings to the contrary over the last three or four decades, a binderless batt may be enclosed by an exterior layer to form a low density insulation assembly having satisfactory resiliency.

The insulation assembly comprises a longitudinally extending mineral fiber batt. The mineral fiber batt, such as a fibrous glass batt, has opposed surfaces. Preferably, the batt is constructed of a binderless, low density fibrous glass wool. The fibrous glass batt of the insulation assembly has a density of less than 0.60 pounds per cubic feet (9.61 kg/M$^3$). Preferably the insulation assembly has a density of between 0.30 pounds per cubic feet (4.81 kg/M$^3$) and 0.50 pounds per cubic feet (8.01 kg/M$^3$).

An exterior layer covers the fibrous glass batt. Preferably, the exterior layer covering comprises a polyethylene package which receives the fibrous glass batt. An adhesive is positioned adjacent one of the batt surfaces to retard relative movement between the batt and for example, a polyethylene film layer. An air passage is provided in the film to direct atmospheric air to the batt to expand the assembly at the job site.

It is object of the present invention to provide an improved insulation assembly for use as ready to install building insulation.

It is a further object of the present invention to provide a binderless, low density mineral fiber insulation assembly which has a recovery ratio of at least 6 to 1. The recovery ratio is the installed thickness of the final uncompressed assembly compared to the thickness of the compressed package in its shipping mode. The installed thickness is commonly referred to as the label thickness.

It is a further object of the present invention to provide a mineral fiber insulation assembly having a relatively smooth, non-irritating outer layer which is readily installed at the job site.

DESCRIPTION OF THE PREFERRED EMBODIMENT

Figure 1:
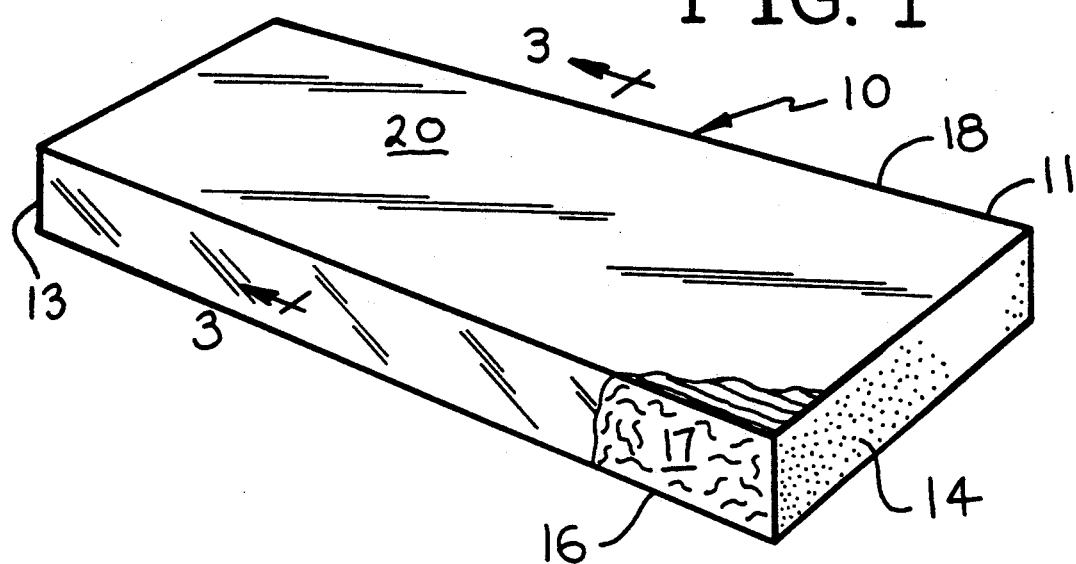
FIG. 1 is a perspective view of an insulation assembly, according to the present invention; with a portion of the outer film removed.
Figure 2:
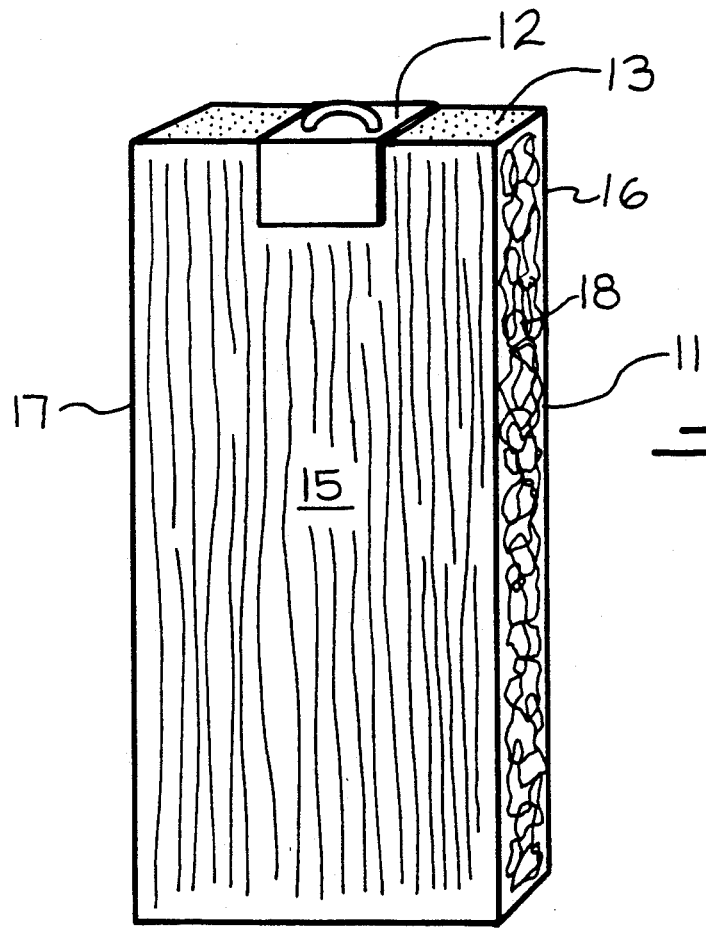
FIG. 2 is a perspective view showing a fibrous glass batt, used to construct an insulation assembly, according to the present invention.

Referring to FIG. 1, an insulation assembly, according to the present invention, is generally indicated by the reference number 10. The insulation assembly 10 includes a mineral fiber batt such as a fibrous glass batt 11. As used in the present specification and claims, the term "batt" refers to a mineral fiber batt which when held by a clamp 12 (see FIG. 2) at its upper end 13, the body of the batt is self supporting and does not disintegrate or fall apart as would be true of, for example, individual units of fibrous glass loose fill material. Accordingly, the mineral fiber batt 11, as the term is used in the present invention, has integrity and is capable of being picked up at the upper end 13 and remain intact.

The mineral fiber batt 11 is, for example, constructed of low density fibrous glass wool having a density of less than 0.60 pounds per cubic feet (9.61 kg/M$^3$). The batt may be constructed of mineral fibers other than fibrous glass. If the mineral fiber is fibrous glass, preferably the batt 11 has a density of between 0.30 pounds per cubic feet (4.81 kg/M$^3$) and 0.50 pounds per cubic feet (8.01 kg/M$^3$). The fibrous glass wool, which forms the mineral fiber batt 11 in the preferred embodiment, has the following chemical and physical characteristics:

(1) It has diminished odors compared to prior art bindered fibrous wool insulation.
(2) It has diminished irritants compared to prior art fibrous wool insulation.
(3) It is light in weight.
(4) It is usually white or pale in color in its natural state.
(5) The entanglement of the fibers stores sufficient energy to provide recovery ratios in excess of 6:1.
(6) The mean length weighted fiber diameter is less than 0.00027 inch (6.86 E-6 Meters). The mean length weighted fiber diameter is preferably between 0.00010 inch (2.54 E-6 Meters) and 0.00024 inch (6.10 E-6 Meters).
(7) The thermal resistance is greater than 1 R/inch (0.1761 $M^{20}$ C/Watt) of batt thickness.

One important feature of the mineral fiber batt 11 is that the fibrous glass wool is binderless. As is used in the present specification and claims, the term "binderless" means the absence of binder materials or the presence of only small amounts of such binder material, amounting to no more than one percent (1%), by weight. Addition of suppressants, e.g. oils, for dust control or other purposes is not considered a binder.

In addition to the upper end 13, the mineral fiber batt 11 includes an opposed bottom end 14, a front surface 15, a rear surface 16, a side surface 17 and an opposed side surface 18.

An exterior layer or cover encloses the mineral fiber batt 11. The term exterior layer or cover includes applying material layers to the two major faces and to the two side edges of the batt. Optionally, material layers can also be applied to the ends of the batt. In the embodiment shown in FIG. 1, the layer comprises a polyethylene package 20. However, in other embodiments the covering layer may comprise a heated polyethylene layer which is applied directly to the fibrous glass batt whereby the heated polyethylene also serves as an adhesive layer which joins the film to the mineral fiber batt 11.

Other alternatives of film covering include a rubberized envelope (not shown) which forms a balloon-type receptacle which receives the fibrous glass batt. Nonwoven materials, such as a mat layer can also be used.

Other films which may be used include A-B self-reacting coatings and crosslinked polymers which are hardened on the surface of the fibrous glass batt by the use of electron beams.

The polyethylene package 20, according to the present embodiment, is constructed from polyethylene film preferably having a thickness of 1.0 mil or less. The polyethylene film is preferably in a thickness range between 0.2 mil and 0.6 mil. In the present embodiment the thickness is 0.4 mil. The outer layer 20 can be constructed from, for example, polyethylene, polybutylene, metalized films, Kraft paper and non-woven materials. The outer layer 20 can consist of one material or comprise a combination of materials.

Figure 3:
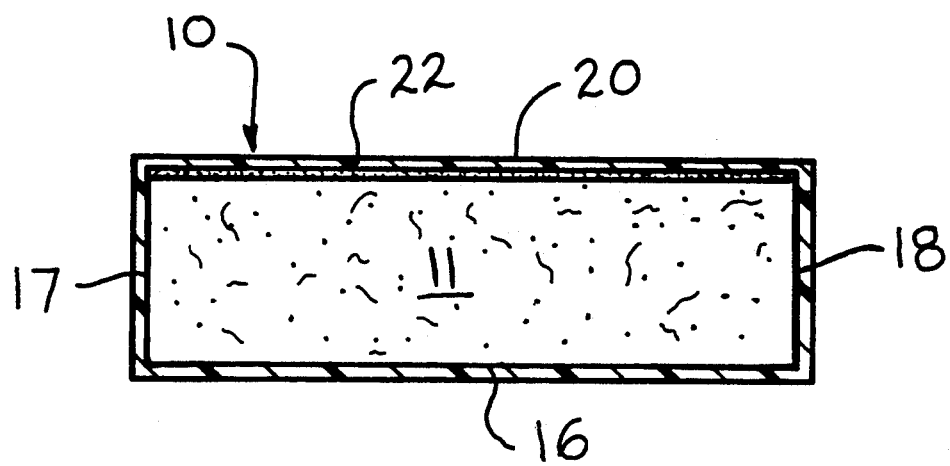
FIG. 3 is a cross-sectional view, taken along the line 3—3 of FIG. 1 and shown on an enlarged scale.

An adhesive layer or strip is positioned on the film adjacent one or more of the fibrous glass batt surfaces. Other patterns of adhesive such as dots or an adhesive matrix can also be used. In the present embodiment, referring to FIG. 3, an adhesive layer 22 is positioned between the front surface 15 of the mineral fiber batt 11 and the polyethylene layer 20. The adhesive layer 22 retards relative movement between the mineral fiber batt 11 and the polyethylene layer 20. This is useful when the assembly 10 is, for example, placed in a vertical position between the studs of a wall. This prevents the mineral fiber batt 11 from shifting downward relative to the film.

As mentioned above, in other embodiments the adhesive layer may be an integral part of the film, with one side of the film providing the adhesive layer to join to the mineral fiber batt. In other embodiments restricting relative movement between the batt and the cover, include mechanical fasteners or the configuration of the cover.

Referring to FIG. 1, in the present embodiment one or more air passageways are provided in the polyethylene layer 20. The air passageways allow atmospheric air to reach the mineral fiber batt 11. An open end, for example the open end 14, may provide the air passageway. In other embodiments holes or slits are provided in the package 20 to provide the required air passages.

During or after the manufacture of the insulation assembly 10, the assembly is tightly compressed and air is removed from the interior of the polyethylene package 20. Removable covers may be placed over the open end 14 or other openings after the air is evacuated from the interior of the polyethylene package 20 and from the mineral fiber batt 11. In the alternative, the batt 11 may be compressed and held in the compressed state by shipping containers or straps. The insulation assembly 10 remains in its compressed state for shipping purposes. At the job site the assembly 10 is allowed to recover to its desired thickness. Air enters the mineral fiber batt 11 through the passageways, such as the open end 14. One of the major physical features of the insulation assembly 10, according to the present invention, is that the recovery ratio is at least 6 to 1. The final thickness of the expanded insulation assembly 10 is at least 6 times the thickness of the assembly 10 while in its compressed or shipping state.

As noted above while the open end 14 has been shown as air passage means, other air passage means may be utilized, including slits in the polyethylene package 20.

Figure 4:
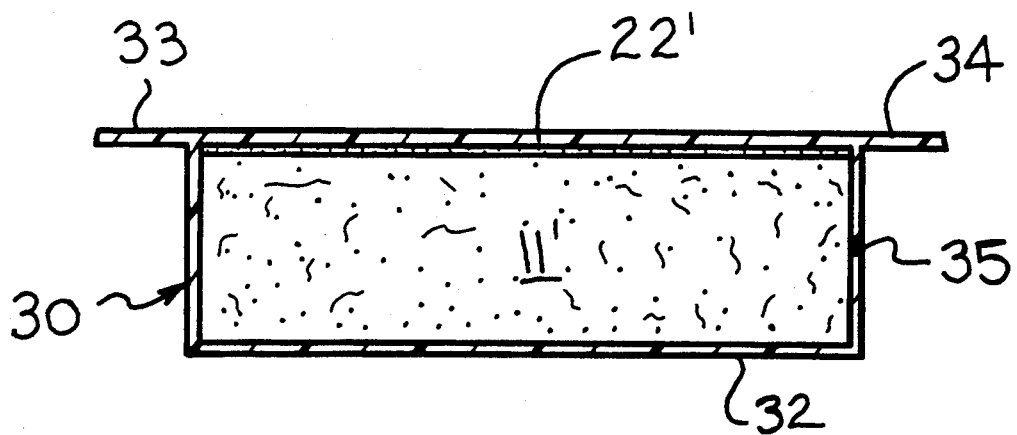
FIG. 4 is a view similar to FIG. 3 showing another embodiment of the present invention.

Another embodiment of the present invention is shown in FIG. 4. In this embodiment, an insulation assembly 30 includes a fibrous glass batt 11' and an adhesive layer 22'. A polyethylene package 32 has side flanges 33 and 34. An opening 35 is provided in the package 32 as an air passage means. In some applications, the side flanges 33 and 34 are vertically aligned with the building members, for example, the vertical wall studs and are connected by staples or other connecting means to the studs to hold the insulation assembly 30 in position.

While the present invention has been disclosed in connection with particular preferred embodiments, many changes and modifications may be made without departing from the scope of the following claims.

We claim:

1. An insulation assembly comprising, in combination, at least one longitudinally extending mineral fiber batt, said mineral fiber batt having opposed surfaces, said batt being constructed of a low density, binderless fibrous material, an exterior plastic layer covering said mineral fiber batt, means for restricting relative movement between said batt and said layer and air passage means in said exterior plastic layer for directing atmospheric air to said batt, wherein said assembly has a recovery ratio of at least 6 to 1.

2. An insulation assembly according to claim 1, wherein said means for restricting is an adhesive on said exterior layer adjacent at least one portion of said batt surfaces.

3. An insulation assembly comprising, in combination, at at least one longitudinally extending fibrous glass batt, said fibrous glass batt having opposed surfaces, said batt being constructed of a low density, binderless fibrous glass wool, said fibrous glass batt having a density of less than 0.60 p.c.f. (9.61 kg/M³), an exterior layer covering said fibrous glass batt, means for restricting relative movement between said batt and said layer and air passage means in said exterior plastic layer for directing atmospheric air to said batt, wherein said assembly has a recovery ratio of at least 6 to 1.

4. An insulation assembly, according to claim 3, wherein said means for restricting is an adhesive on said exterior layer adjacent at least one of said batt surfaces.

5. An insulation assembly according to claim 4, wherein said assembly includes opposed ends and said adhesive includes portions adjacent each of said opposed ends.

6. An insulation assembly according to claim 3, wherein said fibrous glass batt has a density of between 0.30 p.c.f. (4.81 kg/M³) and 0.50 p.c.f. (8.01 kg/M³).

7. An insulation assembly according to claim 3, wherein said exterior plastic layer comprises a polyethylene package.

8. An insulation assembly according to claim 7, wherein said polyethylene package has a thickness of less than 1.0 mil.

9. An insulation assembly according to claim 7, wherein said polyethylene package has a thickness of between 0.2 mil and 0.6 mil.

10. An insulation assembly according to claim 3, wherein said air passage means comprises an end opening in said exterior layer.

11. An insulation assembly according to claim 3, wherein said exterior plastic layer comprises a polyethylene layer having a thickness between 0.20 mil and 0.6 mil.

12. An insulation assembly according to claim 11, wherein said polyethylene layer defines a package having longitudinally extending side edges and side flanges extending outwardly from said side edges.

13. An insulation assembly according to claim 12, wherein said fibrous glass batt is formed from glass fibers having a mean length weighted diameter of less than 0.00027 inch (6.86E-6 Meters).

14. An insulation assembly according to claim 13, wherein said glass fibers have a mean length weighted diameter between 0.00010 inch (2.54E-6 Meters) and 0.00024 inch (6.10E-6 Meters).

15. An insulation assembly, comprising, in combination, at least one longitudinally extending fibrous glass batt, said fibrous glass batt formed from glass fibers having a mean length weighted fiber diameter of less than 0.00027 inch (6.86E-6 Meters), said fibrous glass batt having a density of less than 0.60 p.c.f. (9.61 kg/M³), an exterior plastic layer defining a package and having a thickness between 0.20 mil and 0.6 mil, an adhesive on said plastic layer adjacent at least one surface of said fibrous glass batt, whereby relative movement between said plastic layer and said fibrous glass batt is retarded and at least one opening in said package for admitting atmospheric air to said fibrous glass batt, said insulation assembly having a recovery ratio of at least 6 to 1.

* * * * *